United States Patent [19]

Holdahl

[11] Patent Number: 4,491,162

[45] Date of Patent: Jan. 1, 1985

[54] HAND HELD DUPLICATOR TOOL

[75] Inventor: Robert A. Holdahl, Hopkins, Minn.

[73] Assignee: Toolmark Co., Minneapolis, Minn.

[21] Appl. No.: 432,021

[22] Filed: Sep. 30, 1982

[51] Int. Cl.³ .............................................. B23B 3/28
[52] U.S. Cl. ......................................... 142/7; 142/49; 142/55
[58] Field of Search .................. 142/7, 48, 49, 56, 38, 142/55; 269/97, 228; 82/14 R, 34 R

[56] References Cited

U.S. PATENT DOCUMENTS

| | | | |
|---|---|---|---|
| 2,574,281 | 11/1951 | Olson | 269/228 |
| 2,731,047 | 1/1956 | Webb | 142/1 |
| 3,332,458 | 7/1967 | Baldwin | 142/7 |
| 3,512,561 | 5/1970 | Cortez | 142/38 |
| 3,635,265 | 1/1972 | Cortez | 142/38 |
| 3,836,136 | 9/1974 | Davis | 269/228 |
| 4,200,129 | 4/1980 | Sneed, Jr. | 142/7 |
| 4,256,155 | 3/1981 | Hochstatter et al. | 142/7 |

Primary Examiner—Leonidas Vlachos
Attorney, Agent, or Firm—Kinney & Lange

[57] ABSTRACT

A hand held duplicator tool which provides very stable and accurate operation for duplicating on a wood turning lathe the configuration of a pattern held on the lathe. The duplicator tool includes a movable platform that is moveably supported on a table surface where the table is quickly and easily attached in position on a wood lathe frame to provide a support for moving the tool. The tool can be adjusted for height and used easily and stably in duplicating parts. Additionally, a shield over the workpiece is used in combination with the tool and includes a slot to permit the duplicator tool to be inserted against a workpiece. A vacuum supply is connected to the shield to carry dust, shavings and the like away from the workpiece.

13 Claims, 5 Drawing Figures

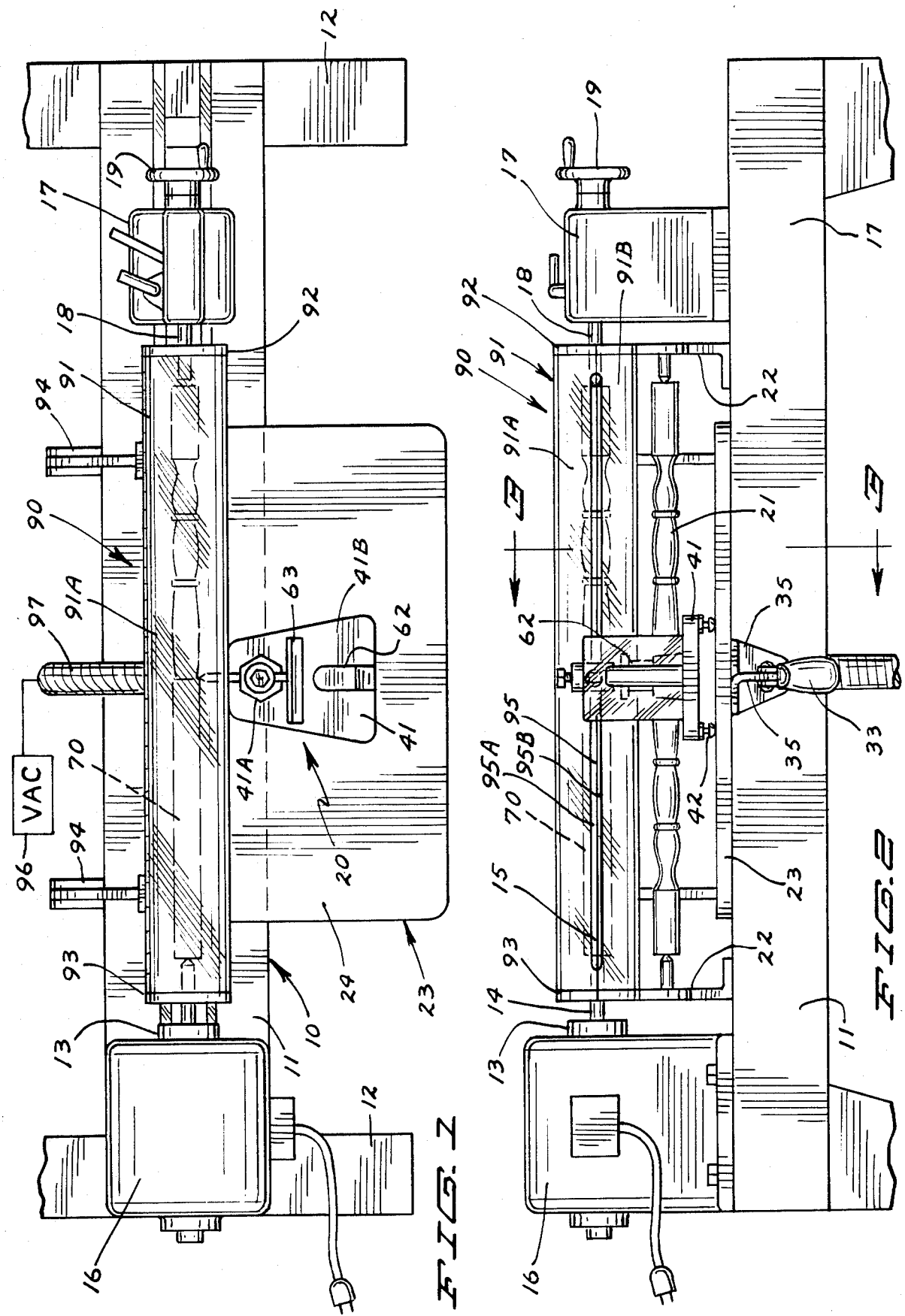

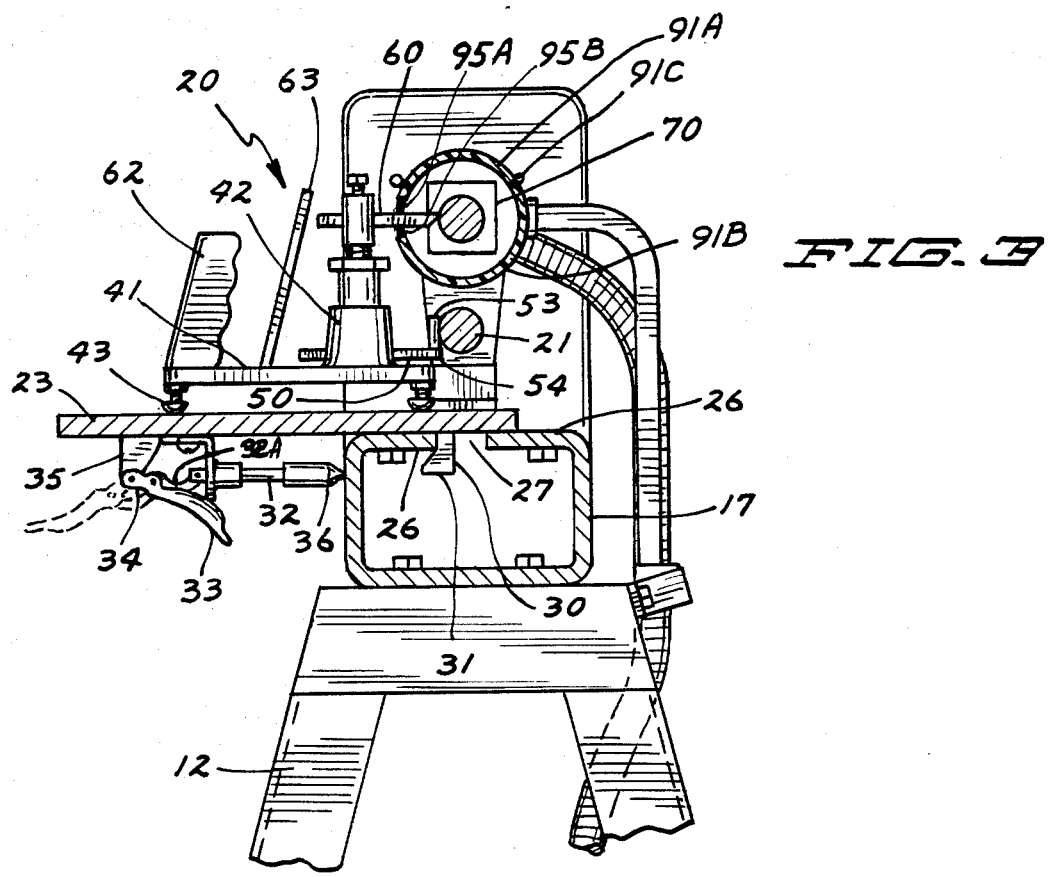
FIG.3
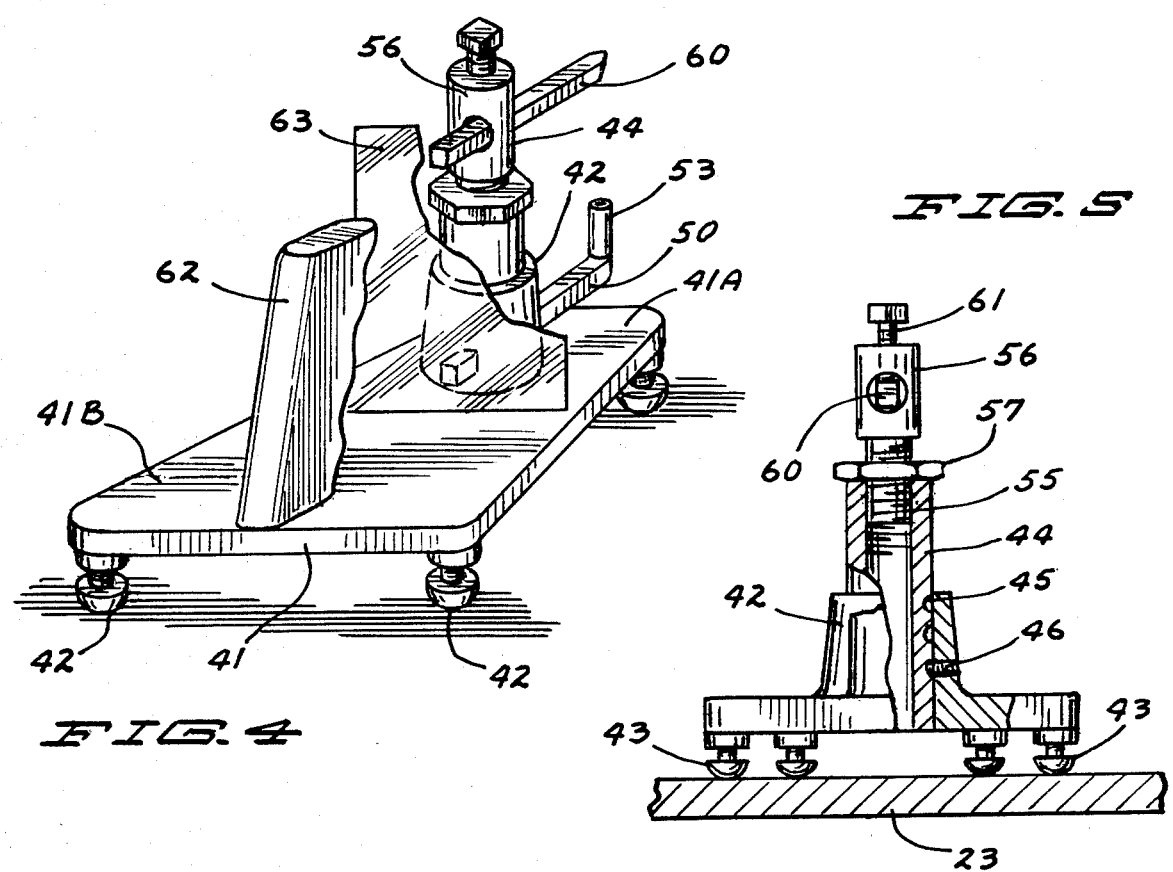
FIG.4
FIG.5

HAND HELD DUPLICATOR TOOL

BACKGROUND OF THE INVENTION

1. Field of the Invention

The present invention relates to tools used with wood turning lathes for making duplicates of a pattern on the wood turning lathe.

2. Description of the Prior Art

U.S. Pat. No. 3,768,527 there is a shown a hand held tool for duplicating patterns on a wood turning lathe. The tool includes a platform that moves along a surface of a table attached to the lathe, and also holding a pattern in position below the workpiece. The workpiece is rotated in the lathe and the duplicator tool has two portions, one a stylus that follows a pattern and the other portion a cutting edge tool that cuts the pattern into the workpiece as the workpiece rotates. The device shown in U.S. Pat. No. 3,768,527 has several limitations in its ability to securely hold the tool in position and prevent "gouging" of the workpiece because of the way that the tool is supported on its platform. Additionally, the disposal of chips and the like in a duplicator assembly is not provided in U.S. Pat. No. 3,768,527.

SUMMARY OF THE INVENTION

A duplicator tool comprises a pattern following stylus mounted on a support plate, and including a wood cutting tool positioned above the stylus so that the plate can be moved along a support surface to duplicate a pattern followed by the stylus in a rotating workpiece in a lathe. The support surface is on a table assembly that has a quick latch clamp that enables the operator to position the table at any desired location along the cutting axis of the workpiece on a wood lathe of conventional design. The tool platform has a hand grip at one end opposite the cutting tool and is slid along the surface of the table and follows a pattern, and at the same time the cutting tool on the platform cuts this pattern into a rotating workpiece on the lathe. The support for the cutting tool is a post that permits vertical, adjustment, and the force is reacted so that when the hand grip is gripped, the tendency of the tool to "gouge" can easily be manually overcome. The hand is kept away from the cutting tool region so that a shield can be positioned between the hand grip and the cutting tool to insure safe operation.

The support for the pattern is easily mounted onto the lathe bed, and because of the adjustability of the cutter tool post in vertical direction, the proper relationship with respect to the axis of rotation of the workpiece can be easily provided.

The pattern following stylus, in the form shown, is a vertical axis roller that easily permits movement of the cutter and pattern following stylus along the pattern. The tool support platform is mounted on vertically adjustable widely spaced feet so that the platform can be made exactly parallel to the surface on which it operates. Some inclination of the platform can be accommodated if desired.

The tool is used, as shown, in combination with a shield or housing surrounding the workpiece and having a slot through which the wood cutting tool can extend. The housing is made at least partially of a clear plastic so that the workpiece can be observed when the housing is in place. Vacuum is supplied to the interior of the housing to remove chips and dust and the like without contaminating the work area. The housing is easily made, and provides for use of the duplicator without putting up with constanting clear up chips from the floor and lathe bed.

BRIEF DESCRIPTION OF THE DRAWINGS

FIG. 1 is a top plan view of a wood lathe utilizing duplicator cutter assembly made according to the present invention and having a shield made according to the present invention installed thereon;

FIG. 2 is a side elevational view of the apparatus shown in FIG. 1;

FIG. 3 is a sectional view taken as on line 3—3 in FIG. 2;

FIG. 4 is a perspective view of a duplicator tool assembly made according to the present invention; and FIG. 5 is a vertical end view of the device of FIG. 4, with parts in section and parts broken away.

DETAILED DESCRIPTION OF THE PREFERRED EMBODIMENTS

A wood lathe indicated generally at 10 has a lathe bed 11, supported on legs 12 in a conventional manner. The lathe bed supports a head stock 13 which has a driven spindle 14 in a conventional design, driving a workpiece drive 15 through the use of an electric motor 16. The lathe bed further supports a tail stock 17 of conventional design that includes a workpiece support spindle 18 that can be adjusted along its axis through the handle 19 in a conventional manner.

The duplicator tool assembly of the present invention indicated at 20 is made to permit duplicating on a workpiece the configuration of a pattern indicated at 21 supported on pattern supports 22 that in turn are mounted on the lathe bed 11. Additionally, the duplicator tool 20 assembly is supported on a quick latch table assembly 23 that provides table top 24 that has an upper surface that is parallel to the axis of the pattern 21 and the turning axis of a workpiece in the lathe, and positioned in proper orientation with respect to the lathe bed. The table 23 is attached to the lathe bed 11 in a suitable manner as shown in FIG. 3 in particular. The lathe bed 11 as shown has a pair of inwardly, directly horizontal flanges 26,26 which define a space 27 therebetween. A pair or more of lugs 30 are fixed to the table top 24 and extend through this slot 27. The lugs 30 have an inclined lip 31 that goes under one of the flanges 26 with the table top 24 extending laterally outwardly as shown in FIG. 3. To hold the table in position, supported on the upper surfaces of one flange 26 an overcenter latch is provided. A compression rod 32 is slidably mounted in a sleeve housing mounted on a bracket 35 attached to the underside of the table top 24. The compression rod 32 is pivotally connected to one end of a link 32A that in turn is pivoted to a lever or handle 33 at a point between the pivotal mounting 34 of the lever 33 and its outer end. The rod 32 has a point member 36 threaded thereon that bears against the side surface of the lathe bed 11, when the lever or handle 33 is in its latched position shown in solid lines in FIG. 3, and when the handle 33 is moved to its dotted line position, the point 36 releases from the side of the lathe and the table can be slid longitudinally along the lathe bed to a different position if desired, or the table can be removed if desired. The point member 36 is threadably mounted on rod 32 to permit the length thereof to be adjusted to hold the table solidly when the lever 33 is latched. The lever 33 pivots to a point where the pivot of the link to the lever goes overcenter with respect to the pivot of the link to rod 32 and the pivot 34. The lever and sliding rod assembly is a purchased, overcenter latching member of conventional design.

The lips 31 have the tapered lip surfaces that fit against the inner lower corner of the flange 26 defining the slot 27, and thus the table is held tightly against the upper surfaces of one of the flanges 26.

The duplicator tool assembly 20, as shown, includes a base plate 41, which has a plurality of vertically adjustable feet 42 at the bottom surface thereof that provide rounded surfaces for sliding the assembly across the table surface 24. The base plate as shown has a generally trapezoidal shape with a narrow end indicated at 41A and a wider end indicated at 41B. The base plate has a collar 42 formed adjacent the narrow end 41A, and this collar has a through bore shown in FIG. 5 that slidably mounts a cutter support post 44 with a close fit. The support post 44 has a plurality of spaced annular grooves 45 therein, and a set screw 46 is mounted in a threaded opening in the collar 42 so that the post 44 can be held in place vertically merely by setting the set screw into one of the grooves 45 as desired.

A pattern following roller stylus indicated generally at 50 has a roller end 53 and a shank 54 that is held in the collar 42 in a suitable manner, such as with a separate set screw. The stylus can be adjusted in and out. The support post 44 may have a slot through which the shank fits. The set screw for the stylus can be mounted in the collar 42 to clamp against the shank 54 and hold the roller in position.

The support post 44 has a threaded interior upper end portion indicated at 55, and a tool post 56 of conventional design is threadably mounted in the upper end portion of support post 44. The vertical position of the tool post 56 relative to the support post 44 can be adjusted by threading the parts relative to each other, and then locking the lock nut 57 in position with the tool at the proper height. This provides vertical adjustment for a wood cutting tool 60. Woodcutting tool 60 is held in position with a set screw 61 in the tool post 56 in the normal manner. Additional vertical adjustments can be made by using the grooves 42 and set screw 46 as previously explained.

The base plate 41 also has a hand grip handle 62 that is fixedly mounted to the wide end 41B of the base, and extends upwardly therefrom. A shield 63 is mounted on the base plate between the tool post and the handle. Shield 63 prevents chips and other debris from flying against the hand of the person that is operating the tool assembly.

A workpiece indicated at 70 is mounted on the workpiece axis between the head and tail stocks and is rotationally driven by the motor 16. The pattern 21, as previously explained is mounted in the supports 22 in proper alignment with the workpiece axis. The supports 22 can be vertically adjustable to position the pattern in a proper location for use with the stylus roller 50. The tool 60 as stated also can be adjusted so that it is at the proper location with respect to the axis of turning of the workpiece 70 for proper operation. Once the table 23 (or other support member) has been locked in position securely, then the entire cutter tool assembly 20 can be moved by gripping the handle 62 and sliding the plate along the table surface so that the stylus roller 53 moves against the pattern. The workpiece is cut with the tool 60 to a shape corresponding to the pattern.

A shield assembly 90 is used in combination with the workpiece. The shield assembly comprises a two-part cylindrical tube 91 having end split caps 92 and 93. The end caps have openings that receive the respective head and tail stocks, and can be sealed with suitable seals to prevent any substantial air leakage around, but can easily be supported thereon. The shield includes an upper clear plastic half cylinder section 91A attached with a hinge to a lower metal half cylinder section 91B. The hinge 95C lies parallel to the axis of the tube and along its length. The upper parts of the end caps move with the upper section 91A when the cylinder sections are hinged to open positions.

The rotating head stock can be mounted on a suitable bushing or bearing in the end cap 93 if desired to support the tube directly on the head stock and tail stock. However, as shown a support arm 94 between the lathe behind the lower portion of the tube 91.

The tubular shield 91 has a longitudinal slot 95 formed therein where the upper and lower sections 91A and 91B meet, opposite from hinge 91C. Upper and lower flexible step seals 95A and 95B are provided along the edges of this slot 95. The cutting tool 60 extends through the slot when it engages the workpiece and the seals 95A and 95B conform to the tool but permit it to be moved along the slot.

A vacuum source indicated at 96 is connected through a suitable hose 97 to the interior of the tubular shield 91, and this creates a vacuum to pull off chips and dust into a remote location to prevent the chips and dust from causing a problem at the area of work.

The base plate 41 of the cutting tool assembly 20 gives great stability, because of its shape (the supports feet are quite widely spaced) and the fact that the grip is separated from the tool post. The tool post is adjacent to the workpiece so that moments are not excessive during use. Of course the leading edge of the roller 53 and the leading tip of the tool 60 will be aligned vertically, and the vertical height of the pattern 21 will be likewise adjusted so that it operates correctly with the roller. Adjustments in height can be made relatively easily for the tool 60 by moving the support post in collar 42, or by the threading adjustment of threads 55.

What is claimed is:

1. For use in combination with a wood turning lathe havng a lathe bed provided with an upper flange and means to support and rotate a workpiece about a turning axis on the lathe bed, the improvement comprising a support including a table member adapted to be mounted on such a lathe bed, said table member having at least one lug mounted thereon adapted to hook over an inner edge of and be retained on the upper flange of such lathe bed with the table member at least partially supported on the upper flange, release latch means on the table member actuable to engage such lathe bed and pull the lug against the edge of such upper flange for holding the table member on such upper flange, said table member having an upper surface positioned in desired orientation with respect to the turning axis, and said table member being slidably arranged for longitudinal movement along such upper flange when the release latch means are released, means to support a pattern to be duplicated adjacent to said table member at a predetermined orientation with respect to the turning axis, a pattern on said support, and a tool assembly movably supportable on the table member having a stylus for following a pattern to be duplicated and having a cutting tool thereon to engage a workpiece supported on the turning axis on such lathe bed to duplicate the configuration of the pattern on such workpiece.

2. The apparatus as specified in claim 1 wherein said support plate comprises a flat plate, and a plurality of adjustable feet members mounted on said plate for permitting adjusting the vertical position of said plate relative to the table surface.

3. For use in combination with a wood turning lathe having a lathe bed and means to support and rotate a workpiece about a turning axis on the lathe bed, the improvement comprising a support including a table member mounted on such lathe bed with an upper surface positioned in desired orientation with respect to the turning axis, means to support a pattern to be duplicated adjacent to said table member at a predetermined orientation with respect to the turning axis, a pattern on said support, and a duplicator tool assembly having a stylus for following a pattern to be duplicated and supporting a cutting tool to engage a workpiece supported on the turning axis on the lathe bed of a lathe to duplicate the configuration of the pattern on the workpiece, and a shield adapted to be mounted on said such lathe bed comprising a two part hinged member substantially encircling a workpiece held for rotation on said turning axis, said shield including a slot extending parallel to the turning axis and adapted to permit the cutting tool to be inserted through the slot to engage a workpiece mounted for rotation about said turning axis within the shield at the same time the stylus is moving along said pattern and means to mount said shield on said lathe bed.

4. The apparatus of claim 3 wherein said shield comprises a generally cylindrical member, and is made in two longitudinally separated sections, a longitudinally extending hinge member joining the two sections along one side of the sections, and a slot being formed by spacing the mating edges of the two sections opposite from the hinge member.

5. The apparatus as specified in claim 3 and vacuum means adapted to provide a vacuum on the interior of said shield.

6. The apparatus is specified in claim 4 wherein said shield comprises a metal section and a transparent section, said hinge and slot lying generally along a diametral plane dividing the shield into upper and lower sections when the shield is positioned on said lathe bed.

7. The apparatus as specified in claim 4 and flexible seal means along said slot to tend to restrict air movement into said shield when the wood cutting tool is positioned to engage a workpiece held for rotation on said turning axis.

8. A duplicator tool assembly for following a pattern held in a first position on a lathe bed, and for supporting a cutting tool to engage a workpiece held on such lathe bed for rotation about the workpiece axis and to duplicate the configuration of the pattern on the workpiece, said duplicator tool assembly including a support plate, a plurality of adjustable feet for supporting said plate on a work surface relative to such lathe bed adjacent the axis of rotation of a workpiece, said plate having a first end and a second end, a tool post mounted adjacent the first end, said tool post comprising a lower collar, a center tubular support shaft adjustably slidably mounted in said lower collar and a threaded shaft threaded into the upper end of the tubular support shaft, said tool post further carrying a stylus comprising the means to follow a pattern held on such lathe, said stylus being positioned adjacent the plate, and a cutting tool mounted on said tool post above said stylus and in general vertical alignment therewith and extending outwardly beyond the first end of the plate, and a handle grip member adjacent the second end of said plate opposite from said tool post and adapted to be gripped to permit movement of the support plate.

9. The apparatus of claim 8 wherein the tubular support shaft has a plurality of vertically spaced annular grooves therein, a set screw mounted in said collar and adapted to selectively engage said grooves to provide for height adjustment relative to the plate.

10. The duplicator tool of claim 8 in combination with a table top member supported on a lathe bed, the lathe bed being provided with an upper flange, at least one hook mounted on the table and adapted to engage an edge of such upper flange, and means on the table for clamping the hook against the edge of a flange of a lathe bed to hold the table on the flange.

11. The combination of claim 10 wherein the means for clamping comprises an over-center latch.

12. For use in combination with a lathe having a lathe bed and means to support and rotate a workpiece about a turning axis, the means to support being spaced along the lathe bed, and means associated with the lathe bed for supporting a cutting tool for engaging a workpiece supported on the means to support, the improvement comprising a shield adapted to be mounted on a lathe bed and comprising a two part hinged tubular member substantially encompassing a workpiece held for rotation on the turning axis of a lathe on which the shield is mounted, said shield having a slot defined therein extendiing generally parallel to the turning axis and adapted to permit a cutting tool used with such lathe to be inserted through the slot to engage a workpiece mounted for rotation about said turning axis within the shield and at the same time permitting such tool to be moved along the workpiece and means for mounting said shield on said lathe bed.

13. The apparatus as specified in claim 1 wherein each lug mounted to said table member has a hook portion which defines an inclined lip facing toward the latch means and toward the direction of said upper flange, which lip slidably engages the inner edge of the upper flange of the lathe bed as the release latch means is actuated to engage the lathe bed, to thereby urge the lower surface of the table member onto the upper surface of the flange, to provide a secure support for said table member.

* * * * *